United States Patent [19]

Tagami et al.

[11] Patent Number: 4,470,124

[45] Date of Patent: Sep. 4, 1984

[54] METHOD OF ADJUSTING THE ZERO-POINT OF RATE TYPE SENSOR

[75] Inventors: Katsutoshi Tagami; Tsuneo Takahashi, both of Saitama; Shinichiro Yasui, Tokyo; Akira Ichikawa, Saitama; Yasuzi Kitasei, Saitama; Akira Hidaka, Saitama, all of Japan

[73] Assignee: Honda Giken Kogyo Kabushiki Kaisha, Tokyo, Japan

[21] Appl. No.: 384,011

[22] Filed: Jun. 1, 1982

[30] Foreign Application Priority Data

Jun. 1, 1981 [JP] Japan .............................. 56-80796[U]
Jun. 4, 1981 [JP] Japan .................................. 56-86134

[51] Int. Cl.³ ........................ G01L 25/00; G06F 15/50
[52] U.S. Cl. ..................................... 364/571; 73/1 D; 73/516 LM
[58] Field of Search ............... 364/424, 571, 565, 575; 73/1 D, 1 E, 178 R, 488, 516 R, 516 LM, 517 R

[56] References Cited

U.S. PATENT DOCUMENTS 3,622,764 11/1971 Walldorf et al. ..................... 364/571
4,188,816 2/1980 Mairson ................................ 73/1 D
4,408,490 10/1983 Takahashi et al. ............ 73/516 LM

*Primary Examiner*—Gary Chin
*Attorney, Agent, or Firm*—Irving M. Weiner; Pamela S. Burt; Anthony L. Cupoli

[57] ABSTRACT

A method of zero-level adjustment of a rate sensor wherein the zero-level adjustment in the detection of yawing rate is obtained by subtracting a quantity of drift of an output from the rate sensor during the period of time that the vehicle is stopped or standing still from a subsequent output therefrom in the normal travelling operation of the vehicle. The current state of the vehicle, i.e., whether it is travelling or standing still, is detected by a travel distance sensing device which generates electric pulse signals for a given unit distance travelled by the vehicle; and the sampled outputs from the rate sensor are averaged for the period from immediately after the detection of a standing still state of the vehicle to the moment just before a starting of travel thereof. The thus-obtained averaged value is determined as a current drifting value of the sensor and is subtracted from a current angle of deviation value obtained during normal travel of the vehicle. A substantial improvement in accuracy of zero-level adjustment is thereby attained.

2 Claims, 5 Drawing Figures

METHOD OF ADJUSTING THE ZERO-POINT OF RATE TYPE SENSOR

BACKGROUND OF THE INVENTION

1. Field of the Invention

The present invention relates to an improvement in or relating to adjustment of a travel route detecting device for use in a vehicle, and more particularly to an improved method of adjusting a rate-type travel route detecting sensor for use in an automobile and the like.

2. Description of the Prior Art

As an efficient aid for a driver of an automotive vehicle or the like to avoid losing his way while driving at night or in unfamiliar surroundings away from his desired route of travel, there have been developed a variety of apparatus which are designed to visually indicate continuously or discretely a due current position or similar information relating to the vehicle by way of an indication panel or display screen including a related road map or the like disposed at the driver's seat so that he may fully receive a necessary ready guidance relating to the vehicle's current status of travel with respect to the desired course of travel.

In the conventional travel route indicating apparatus for such an application, a current bearing and quantity of azimuthal deviation of the vehicle are detected by a bearing detecting section which employs a rate-type gyroscope, a gas rate sensor or the like adapted to detect a possible angular velocity produced about the axis of yawing motion of the vehicle, the gate rate sensor being a typical means for detecting an azimuthal motion of the vehicle. The gas rate sensor is specifically designed to detect an angular velocity produced from a turning motion of the vehicle in terms of a fractional or fine amount of difference in the sensed heat factor as generated by a possible change in the gas flow within the gas rate sensor from an azimuthal deviation such as generated in the turning motion of the vehicle, wherein a current location of the vehicle along its travel route is obtained from an arithmetic operation on the thus-obtained data, and the results of this arithmetic operation are stored in sequence, and indicated visually by way of spot information varying from time to time on a display screen upon which there is presented a transparent road map of routes or roads along which the vehicle travels in cruising operation. In the installation of such gas rate sensor onto the automotive vehicle's body, because it is subjected to incessant and irregular vibrating motions as caused during the travelling motion of the vehicle, there inevitably exists undesirable drift in the detection of a current rate of yawing motion in the body of the automobile. With the employment of such conventional gas rate sensor as it is, it is very possible that spot information showing a current orientation of the vehicle on the display would deviate from a predetermined course of travel due to a thusfar accumulated quantity of error in detection as created from a possible drift in the operation of the gas rate sensor during travel with many turns to such an extent that such information relating to the vehicle's location would indicate an erroneous location on the display. Therefore, it becomes extremely difficult or even impossible for the vehicle's driver in practice to determine whether the displayed information on the display is erroneous or his vehicle is actually travelling in a different or wrong way, thus causing substantial ambiguity.

In this respect, according to the typical conventional construction of a travel route indicating apparatus for use in an automotive vehicle, a current value of the rate of yawing motion of the vehicle is detected each time the vehicle stops, and the thus-obtained value of drift is simply to be subtracted from an output of the rate sensor as obtained in subsequent travel of the vehicle, thereby providing sequential adjustment of the zero-level of the detection value from the yawing rate as obtained in the rate sensor.

With such a manner of adjustment of the zero-level in the detection of yawing rate by way of the conventional rate sensor arrangement, it is to be noted that there would be produced a relatively large output signal representing yawing rate from the rate sensor such as at a moment immediately after the vehicle stops or starts with a substantial amount of vibrating motion in the vehicle's body. With such an extraordinary output of detection of yawing rate, however, being subtracted from a subsequent output of the rate sensor in the normal running operation, it is natural that there would inevitably be produced a substantial amount of error in this particular zero-level adjustment per se.

In addition, even when the automotive vehicle is stopping, there would occur similar situations providing a relatively large output of yawing rate detection with a possible swing motion of the vehicle's body as generated by instances such as a sudden gust of wind, a slam of a door, a contingent quick turning of the steering wheel, etc.

The present invention is essentially directed toward overcoming such inconveniences and difficulties as experienced in the conventional design of a visual travel route indicating apparatus which incorporates a gate rate sensor.

SUMMARY OF THE INVENTION

It is therefore a primary object of the present invention to provide an improved method of zero-level adjustment of a rate sensor of the type wherein the zero-level adjustment in the detection of yawing rate is obtained by the subtraction of a quantity of drift of an output from the rate sensor during the period of time that the vehicle is stopping or stands still from a subsequent output therefrom in the normal running operation of the vehicle, wherein the outputs as attained immediately after and before the start of the vehicle are not to be detected as a due quantity of drift in the detection of yawing rate.

It is another object of the present invention to provide an improved method of zero-level adjustment of a rate sensor wherein a substantial improvement in the accuracy of zero-level adjustment is attained by the steps of sequentially weighting a current detection of yawing rate as outputted from the rate sensor during stopping of the vehicle, averaging the thus-weighted values of detection and subsequently subtracting the thus-averaged values of detection from an output from the rate sensor as obtained in the normal running operation of the vehicle.

It is still another object of the present invention to provide an improvement in the accuracy of zero-level adjustment wherein if there is observed a relatively large output from the rate sensor while the vehicle stands still, which output would represent an extraordinarily large difference from the average value as obtained up to immediately before such time, such large output from the rate sensor is not employed for the averaging process for the weighted values of yawing rate detection.

According to the present invention, there is provided, as briefly summarized, an improved method of adjusting the zero-level of a rate sensor which comprises the steps of detecting a current state of an automotive vehicle, whether it is in a state of travelling or stopping, in accordance with the existence of the output from travel distance sensing means for generating electric pulse signals at a given unit travel distance of the vehicle, averaging for sampling purposes the output from the rate sensor installed upon the vehicle during the period from immediately after the detection of a stopping state thereof to the moment right before a starting movement thereof, determining the thus-obtained averaged value as a current drifting value of the sensor, and subtracting the thus-determined drifting value from a current normal angle of deviation value as obtained in a turning motion during the normal running operation of the vehicle. In this manner, a proper detection of a current drift value of the rate sensor may be made with assurance in accordance with the characteristic frequency particular to the vehicle as free from any disturbances, thus ensuring a high accuracy in the zero-level adjustment of the rate sensor in accordance with the thus-obtained proper value of drifting.

The above and further objects, details and advantages of the present invention will become more apparent from the following detailed description by way of a preferred embodiment of the invention, when read in conjunction with the accompanying drawings, in which like parts are designated with like reference numerals.

DETAILED DESCRIPTION OF THE INVENTION

The present invention will now be described in detail by way of preferred embodiments thereof in conjunction with the accompanying drawings.

Figure 1:
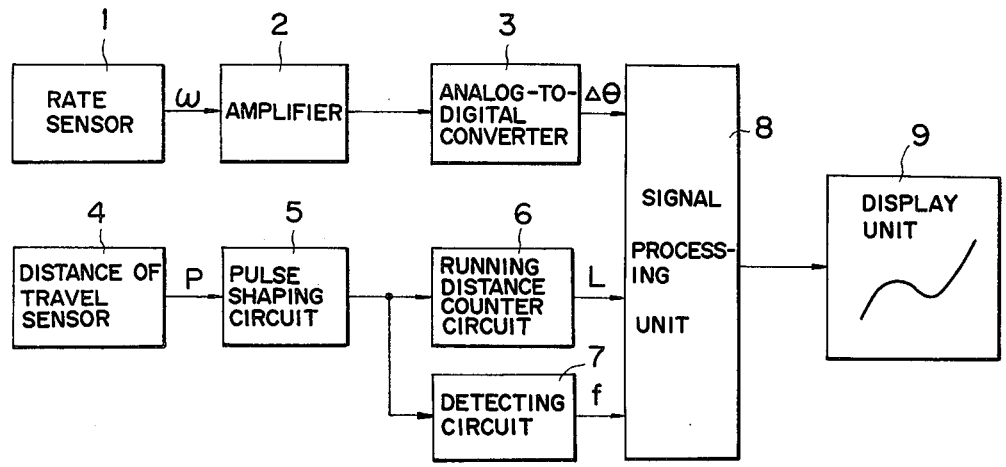
FIG. 1 is a schematic block diagram which shows an example of a basic arrangement for an improved method of zero-level adjustment made available for a rate sensor for use in a travel route indicating apparatus according to the present invention by way of a preferred embodiment thereof.

Now, referring to FIG. 1, there is shown schematically the typical and basic construction of an improved travel route indicating apparatus for use in an automotive vehicle according to the present invention, in which the improved method of zero-level adjustment of a rate sensor is practiced. The apparatus comprises, by way of a preferred embodiment thereof, a rate sensor 1 adapted to detect a current angular velocity about the axis of yawing motion of the body of an automotive vehicle, a rate of yawing motion amplifier 2 adapted to amplify the output signals from the rate sensor 1, an analog-to-digital converter 3 adapted to sample the thus-obtained amplified output from the amplifier 2, a distance of travel sensor 4 adapted to generate electric pulse signals at a given interval of unit distance of travel of the vehicle, a pulse shaping circuit 5 for shaping the pulse output from the sensor 4, a travel distance counter circuit 6 for counting the thus-shaped pulse signals, a detecting circuit 7 for detecting the frequency of the output from the pulse shaping circuit 5, a signal processing unit 8 which comprises a microcomputer adapted to operate in a predetermined manner on the basis of the outputs from the analog-to-digital converter 3, travel distance counter circuit 6 and the frequency detecting circuit 7, and a display unit 9 which is driven with the control output from the signal processing unit 8.

With such construction of the vehicle travel route indicating apparatus according to the present invention, it may advantageously operate as explained hereinafter in conjunction with the accompanying drawings.

In operation, the rate sensor 1 in this arrangement will operate to continuously detect an angular velocity $\omega$ of a current azimuthal deviation as produced in the turning operation of the vehicle, the output signal from the rate sensor 1 being amplified by the rate of yawing motion amplifier 2, and thereafter converted by the anlog-to-digital converter into a signal, which represents an angle of deflection $\Delta\theta(\Delta\theta=\omega\Delta t)$ in accordance with a current travel direction of the vehicle, at an interval of unit time $\Delta t$, the thus-obtained angle of deflection angle $\Delta\theta$ being fed to the first input of the signal processing unit 8. At the same time, a pulse signal P which is outputted from the travel distance sensor 4 in accordance with a unit travelling distance of the vehicle is delivered to the travel distance counter circuit 6 through the pulse shaping circuit 5, a travel distance signal L obtained from the count at the counter circuit 6 being then fed into the second input terminal of the signal processing unit 8, and concurrently, the frequency detecting circuit 7 functions to detect the output frequency of the pulse signal P, the thus-obtained detection signal f being fed to the third input terminal of the signal processing unit 8, accordingly. Then, the signal processing unit 8 now operates to perform a desired arithmetic operation on the signals delivered from the first, second and third input terminals of the unit 8, as will be explained hereinbelow, the display unit 9 being driven in accordance with the result of such operation so as to visually indicate a current location of the vehicle, as the case may be. The display unit 9 may be of the generally known type such that a current location of the vehicle while travelling is indicated on a cross-point in terms of two-dimensional coordinates such as on X-Y axes, accordingly.

More specifically, according to the arrangement of the invention as described above, the signal processing unit 8 is specifically adapted to determine whether the vehicle is in a state of stopping or in a cruising state, depending upon whether or not the frequency detection signal f from the frequency detecting circuit 7 is zero. When there is detected a state of cruising of the vehicle, the signal processing unit 8 functions in such a manner that a current drift value D at the rate sensor 1 which is preset is subtracted from a current signal of deflection $\Delta\theta$ as delivered in sequence from the analog-to-digital converter 3, whereupon the thus-corrected angle of deflection signals ($\Delta\theta$-D) are accumulated so as to obtain a current angle of deviation $\theta$, thus obtaining sequentially a current location of the vehicle with the arithmetic operation on the basis of the thus-obtained current angle of deviation $\theta$ and the travel distance signals fed from the travel distance counter circuit 6 from time to time, accordingly. In this case, in order to obtain a current location of the vehicle in terms of the crossing point of the two-dimensional coordinates consisting of the X- and Y-axes, it is represented with the following equation, i.e.;

$$X = \int_0^t \cos\theta \cdot dL$$

$$Y = \int_0^t \cos\theta \cdot dL$$

On the other hand, when there is detected that the vehicle is standing still, the signal processing unit 8 is specifically arranged such that a current angle of deviation signal $\Delta\theta$-D as obtained from a current correction of drifting at that moment is taken as zero, thus preventing the accumulating operation from occurring, accordingly.

With such an advantageous arrangement according to the invention, the thus obtained current locational data on the vehicle which varies from time to time is to be fed to the display unit 9, so as to visually indicate a current path of travel of the vehicle thereon.

At the same time, by virtue of the specific construction as practiced by way of the preferred embodiment of the invention, there is provided a further advantageous arrangement such that the signal processing unit 8 is adapted to read and weight a current signal of deviation $\Delta\theta$ as fed from the analog-to-digital converter 3, particularly when the state that the vehicle is standing still is detected, whereupon the thus-processed signal is further subjected to low-pass filter processing for averaging purposes, the thus-averaged value of the angle of deviation signal $\Delta\theta$ throughout the period that the vehicle stands still being stored as a due value of drifting D at the rate sensor 1, accordingly.

In this connection, for the specific purpose of obviating the output of the rate sensor as possibly generated from an accidental lateral swinging motion of the automotive body such as in the moment immediately before and/or after start-up from the averaging process, it is arranged such that reading of a current angle of deviation signal $\Delta\theta$ is started several seconds (for instance, 2 sec.) after the detection of a state of stopping of the vehicle at the signal processing unit 8, so as to sequentially perform the arithmetic operation for an averaged value of the angles of deviation $\Delta\theta$ and to be updated accordingly, and that at a moment of detection of the travelling state of the vehicle, the thus-obtained average value which was stored several seconds (for instance, 2 sec.) before that point of detection of the vehicle's travelling state is taken as a current value of drifting D of the rate sensor 1, accordingly.

Figure 2:
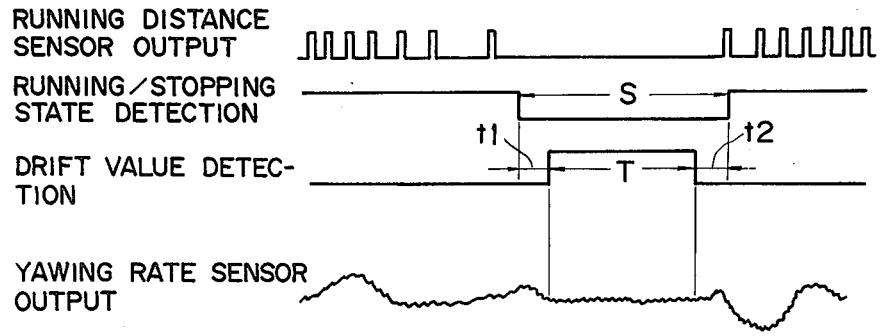
FIG. 2 is a timing chart showing signals as produced at the time of detection of drifting values obtained from the preferred embodiment shown in FIG. 1.

Referring now to FIG. 2, there is shown a timing chart taken when a drifting value D is obtained with respect to current signals of the circuit elements involved wherein reference character S shows the period of detection of a still state of the vehicle, T showing the period of detection of a drift value of the rate sensor 1, and t1 and t2 showing the null period of detecting a drift value during the period S, respectively.

More specifically, even during the period of detection of a drift value T when the vehicle stands still, and when an extraordinary extent of the angle of deviation signal $\Delta\theta$ happens to be detected, which cannot be considered as being from a drifting of the rate sensor 1 as might possibly be produced by such a disturbance as a gust of wind, it is arranged that the signal processing unit 8 functions to nullify the value to be detected thereby, so as to be excluded from the averaging process for the determination of the drifting value D of the rate sensor 1, accordingly. In practice, assuming for instance that a current difference as obtained from comparison between the average value of the angles of deviation $\Delta\theta$ as taken at an interval of 1 second and the average value obtained immediately before that moment is greater than the predetermined level, the signal processing unit 8 is arranged to determine such average value to be abnormal, thus obviating it from being stored.

Figure 3:
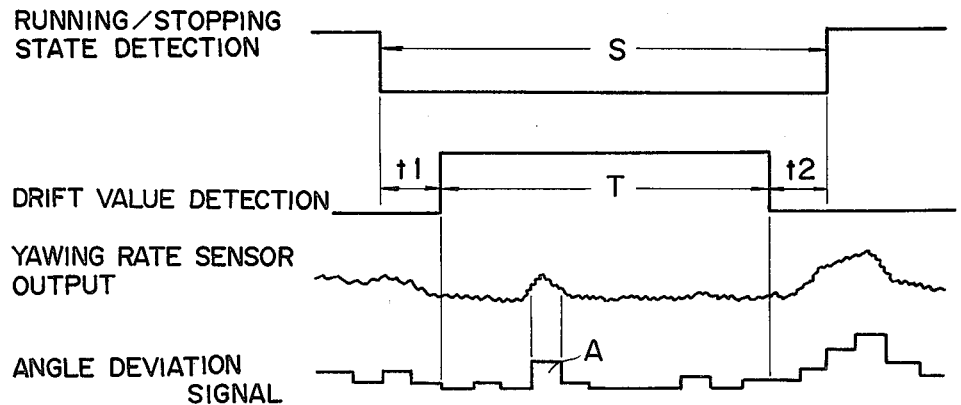
FIG. 3 is a timing chart similar to FIG. 2 showing signals as produced in the processing at the time of detection of driving values according to the present invention.

FIG. 3 is another timing chart showing the current signals from the elements involved in the system, wherein the reference character A shows specifically an abnormal signal to be nullified at the signal processing unit 8.

By virtue of the method of zero-level adjustment on the rate sensor according to the present invention, it is advantageously arranged such that the thus-obtained drift value D of the rate sensor 1 as taken during the period that the vehicle stands still as described above is subtracted from a current angle of deviation being fed from time to time from the analog-to-digital converter 3 when the vehicle is cruising, thereby correcting the extent of drifting in the rate sensor 1, and consequently, it is now feasible in practice that the zero-level adjusting of the rate sensor 1 is conducted with a due precision, and therefore it is possible to present a correct indication with respect to the current path of travel of the vehicle substantially free from any accumulated errors. More specifically, according to the advantageous arrangement of the present invention as described above such that the drifting value D may be determined with the weighted averaging process on the current angles of deviation $\Delta\theta$ from the analog-to-digital converter 3, it is assured accordingly that the number of effective digits of the angle of deviation signal with due correction of drifting value as obtained through the step of ($\Delta\theta$-D) would then be greater than that of the angle of deviation signal $\Delta\theta$ as detected from the analog-to-digital conversion of the output of the rate sensor 1, whereby there may be attained substantial improvement in the accuracy of detection of an angle of deviation in accordance with the travel direction of the vehicle. More strictly, in a case where the current angle of deviation signal $\Delta\theta$ as obtained from the analog-to-digital conversion is found to be an integer, e.g., 52 mV for example, only if the current value of drift D as obtained from the averaging process is of a value having two decimal digits, for example, 31.24 mV, there is obtained such a value of angle of deviation signal with a due correction of drift as the step of $(52-31.25)=19.75$ mV, which results in a substantial improvement in the representation of digits, accordingly.

In employing the aforesaid arrangement for use, it is generally required to provide the travel distance sensor 4 for the detection of a state as to whether the vehicle stands still or runs, and for this purpose, it is preferred to arrange the travel distance sensor 4 directly upon one of the axles or the output shaft of the transmission of the vehicle for assuring a proper operation. In this connection, according to the conventional arrangement, it is generally the practice to provide the extension of a flexible cable from the axle or the output shaft of the transmission as practiced in the conventional arrangement of the speedometer in such a manner that the rotating motion of such shafts through the extension shaft may be detected indirectly, inevitably resulting in a possible delay in the transmission of such shaft rotation due to a flexibility thereof which would somehow influence the aspects of detection of the state of cruising and/or stopping of the vehicle. In this respect, in practicing of the present invention, it is preferred to provide an effective means to connect the travel distance unit 4 directly with the rotating shafts on the part of the vehicle as mentioned above, by way of such physical means as a magnetic sensor, a photosensor, etc. (not shown), which may be installed for a direct detection of the rotating number of such system, without any defect of delay in the detection as involved in the conventional flexible cable, or the like.

With reference to means for detecting an azimuthal deviation of the automotive vehicle as provided in the form of a rate sensor in the present invention, there may be provided a mechanical type rate gyroscope, a gas rate sensor, or the like, the latter gas rate sensor being designed to detect a fractional or fine amount of difference in the sensed heat factor as generated by a possible change in the gas flow therein from an azimuthal deviation such as generated in the turning motion of the vehicle during cruising. In this connection, when it is installed upon the vehicle's body, it is essential to arrange the sensor in such a manner that it per se may be located in the horizontal position with respect to the surface of the road, or a horizontal reference.

Figure 4:
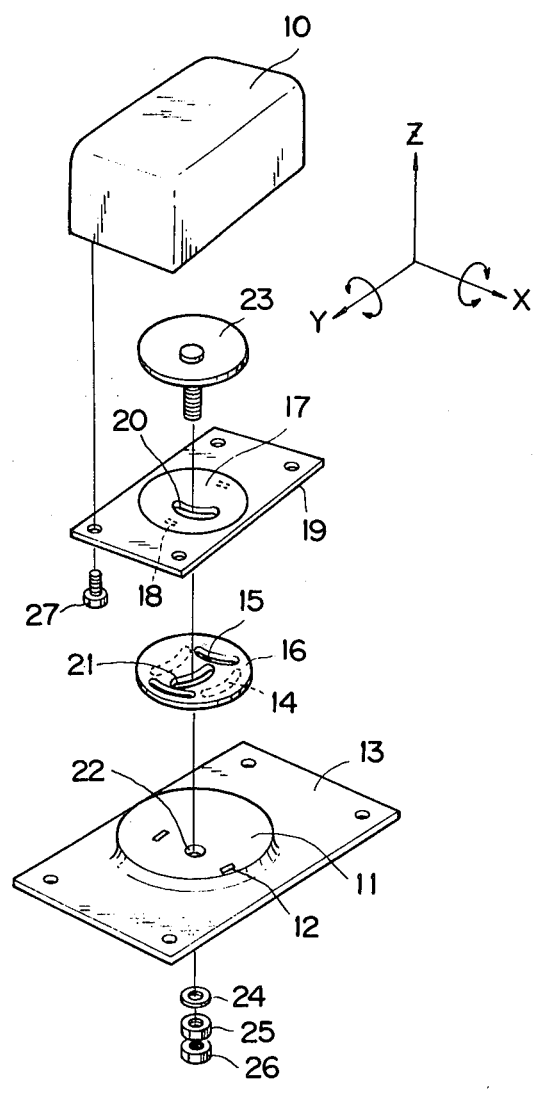
FIGS. 4 and 5 are exploded perspective views each showing a mount for a rate sensor by way of preferred embodiments of the present invention, respectively.

Next, referring to FIG. 4, there is shown a preferred embodiment of mount means according to the invention which is readily adjustable so as to have the rate sensor mounted in the horizontal position when installing the same upon the vehicle's body. According to this particular embodiment, there is provided an improved mount for the rate sensor according to the invention, which comprises a base or bracket 13 having a semi-spherical surface 11 with a concave side facing upwardly and a guide lug 12 projecting upwardly from the semi-spherical surface 11; a guide plate 16 having a semi-spherical surface complementary with that of surface 11 of the bracket 13 and having a pair of guide grooves 14 formed on a surface facing towards the semi-spherical surface 11 extending in parallel with each other and adapted to cooperate with the guide lug 12 so as to allow a swingable motion about the Y-axis as shown, and also having a pair of similar grooves 15 extending in parallel with each other and at right angles to the guide grooves 14 on the opposite surface of the guide plate 16; and a mount bracket 19 for the rate sensor 10, having a semi-spherical surface 17 formed to be closely complementary with the guide plate 16 and having a pair of guide lugs 18 adapted to engage with the paired guide grooves 15 so as to allow a swingable motion therealong about the X-axis as shown; and a bolt 23 having a concave semi-spherical shaped head which is designed to engage in operative complementary relationship with the concave semi-spherical surface 17 of the mount bracket 19 and extending through an elongated hole 20 provided in semi-spherical surface 17. A similar elongated hole 31 is formed to extend at right angles with respect to the elongated hole 20, and a central opening 22 is formed in the central portion of the semi-spherical surface 11 of the base or the bracket 13, when assembled together, by aid of double nuts 25, 26 and through a washer 24. In the installation of the rate sensor 10, it is required that the center of the sensor 10 will be located exactly in correspondence with that of the semi-spherical surface 17 of the bracket 19.

With the above-described mount arrangement for the rate sensor 1 according to the invention, the rate sensor 1 may be adjusted with respect to its attitude in the horizontal position, when installed upon the bracket 19, in such a manner that the cooperative engagement between the paired guide grooves 14 formed in the convex surface side of the guide plate 16 and the guide lug 12 projecting from the concave surface of the base bracket 13 allow a relative inclining motion therebetween about the X-axis as shown with the motion of the guide plate 16. The similar cooperative engagement between the paired guide grooves 15 of the guide plate 16 and the guide lug 18 on the semi-spherical surface 17 of the bracket 19 would correspondingly allow a relative swinging motion therebetween about the X-axis as shown with the motion of the bracket 19. Also, with the aid of such advantageous arrangement of semi-spherical surface contact which allows mutually independent swingable motion about both the X- and Y-axes, as mentioned above, the positional adjustment be performed concurrently about the two X- and Y-axes and a relatively large extent of adjustment may be obtained with a small quantity of adjusting motion, and with a relatively simple adjusting operation employing a single bolt 23. Incidentally, by virtue of such specific arrangement wherein each of such elements is mutually in contact with the semi-spherical surface therebetween, there is assured a rigid engagement throughout the mount even with contingent strong vibrations during cruising of a vehicle.

Figure 5:
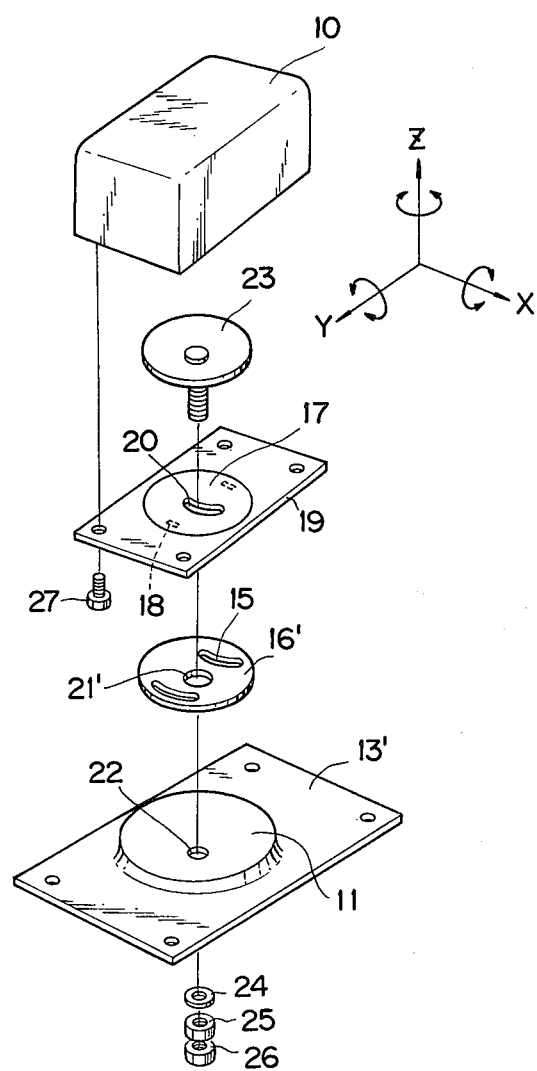

Referring now to FIG. 5, there is shown another embodiment of the mount for the rate sensor 1 according to the invention, wherein no guide lugs 12 are provided on the concave semi-spherical surface 11 of the mount bracket 13 and no guide grooves 14 are provided in the convex side surface of the guide plate 16 as is the case in the embodiment shown in FIG. 4, and instead there is provided a modified guide plate 16' which is adapted to move swingably along the semi-spherical surface 11 of the mount bracket 13', whereby locational adjustment may be conducted not only about both axes of the X and Y axes, but also about the Z-axis, concurrently and independently. As a consequence, with this particular arrangement for the mount of the rate sensor according to the last mentioned embodiment of the invention, the adjustment of the rate sensor 1 in the horizontal position as well as the orientation thereof in the horizontal plane about the Z-axis may be effected.

As fully explained hereinbefore, according to the present invention there is provided an improved method of adjusting the zero-level of a rate sensor which is advantageous in that there are provided means for detecting a current state of the automotive vehicle, whether travelling or stopping, in accordance with the existence of the output from the travel distance sensor for generating electric pulse signals at a given unit travel distance of the vehicle, means for averaging for sampling purposes the output from the rate sensor installed upon the vehicle during the period from immediately after the detection of a stopping state thereof to the moment right before starting travel thereof, and determining the thus-obtained averaged value as a current drifting value of the sensor, and means for nullifying a sampling value having a level exceeding a predetermined value as obtained during the averaging step, so that the thus-obtained drift value may be subtracted from a normal angle of deviation value as obtained in a turning motion during the normal travelling operation of the vehicle. In this manner, a proper detection of a current drift value of the rate sensor may be ensured in accordance with the characteristic frequency particular to the vehicle free from any appreciable disturbances such as a gust of wind blowing from the lateral side of the vehicle's body, etc., and whereby high accuracy in the zero-level adjustment of the rate sensor in accordance with the thus-obtained proper value of drifting is ensured.

It will now be clear that the objects as set forth hereinbefore among those made apparent from the preceding description are efficiently attained, and because certain changes and modifications may be made in the foregoing teaching without departing from the spirit and scope of the invention, it is intended that all matter contained in the foregoing description or shown in the accompanying drawings shall be interpreted as illustrative and not in any manner restrictive.

It is also to be understood that the appended claims are intended to cover all of such generic and specific features particular to the invention as disclosed herein and all statements relating to the scope of the invention, which might be said to fall thereunder.

What is claimed is:

1. A method of adjusting the zero-level of a rate sensor which comprises the steps of:
    detecting a current state of an automotive vehicle, whether it is in a state of travel or standing still, in accordance with the output from travel distance sensing means which generates electric pulse signals for a given unit distance travelled by said vehicle;
    averaging the sampled outputs from said rate sensor installed upon said vehicle, during the period from immediately after the detection of a standing still state thereof to the moment right before a starting of travel thereof;
    determining the thus-obtained averaged value as a current drifting value of said sensor; and
    subtracting the thus-determined drifting value from a current angle of deviation value as obtained in a turning motion during the normal travelling operation of said vehicle;
    whereby a proper detection of a current drift value of said rate sensor is ensured, free from any disturbances, and high accuracy in the zero-level adjustment of said rate sensor is ensured in accordance with the thus-obtained proper value of drifting.

2. A method of adjusting the zero-level of a rate sensor in accordance with claim 1, which further comprises the step of:
    nullifying a sampling value having a level exceeding a predetermined value as obtained during said averaging step.

* * * * *